(12) United States Patent
Chen

(10) Patent No.: US 7,445,356 B2
(45) Date of Patent: Nov. 4, 2008

(54) BACKLIGHT DEVICE

(75) Inventor: Ga-Lane Chen, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 239 days.

(21) Appl. No.: 11/308,316

(22) Filed: Mar. 16, 2006

(65) Prior Publication Data

US 2006/0262559 A1  Nov. 23, 2006

(30) Foreign Application Priority Data

May 17, 2005  (CN) .................. 2005 1 0034713

(51) Int. Cl.
*F21V 29/02* (2006.01)
(52) U.S. Cl. .................. 362/294; 362/614; 362/96; 362/373
(58) Field of Classification Search .................. 362/614, 362/216, 96, 218, 294, 341, 373; 349/70
See application file for complete search history.

(56) References Cited

U.S. PATENT DOCUMENTS 5,791,770 A * 8/1998 Hoyt et al. .................. 362/294
5,982,546 A * 11/1999 Kawamoto et al. .......... 359/584
5,993,027 A * 11/1999 Yamamoto et al. .......... 362/294
6,336,728 B1 * 1/2002 Deloy ........................ 362/614
6,789,923 B2 9/2004 Liao
7,021,799 B2 * 4/2006 Mizuyoshi .................. 362/373
7,241,026 B2 * 7/2007 Lescourret et al. .......... 362/240
7,284,874 B2 * 10/2007 Jeong et al. .................. 362/97

FOREIGN PATENT DOCUMENTS

CN  1567064 A  1/2005
JP  11-202800  7/1999

* cited by examiner

*Primary Examiner*—Stephen F Husar
*Assistant Examiner*—Peggy A. Neils
(74) *Attorney, Agent, or Firm*—Winston Hsu

(57) ABSTRACT

A backlight device (100) includes a reflection plate (110) having a reflective surface and a heat dissipating surface, and a light source module (120) disposed adjacent to the reflective surface of the reflection plate; the light source module comprising at least one cold cathode fluorescent lamp, and the cold cathode fluorescent lamp comprising at least two parallel linear portions (122) and at least one intermediate portion (121) interconnected to the at least two linear portions. The backlight device further includes a cooling module (130). The cooling module is attached on the heat dissipating surface of the reflection plate. The present backlight device can improve brightness and chroma uniformity. And the brightness of the light source module is improved, and the utilization efficiency of light thereof is also increased, accordingly.

10 Claims, 9 Drawing Sheets

BACKLIGHT DEVICE

FIELD OF THE INVENTION

The present invention relates to backlight devices and, more particularly, to a direct type backlight device with a high displaying quality and a self-cooling function.

DESCRIPTION OF RELATED ART

Nowadays, liquid crystal materials are widely utilized in various liquid crystal displays having different sizes for different applications, such as TVs, liquid crystal projectors, mobile telephones, personal digital assistants (PDA), etc. Because liquid crystal itself cannot emit light, light sources must be utilized to illuminate liquid crystal for image display. The light sources are called backlight sources since they are usually configured behind liquid crystal panels. A combination of all components behind the liquid crystal panels, including the light sources, is generally referred to as a backlight module. Usually, backlight modules can be classified into edge lighting backlight devices and direct type backlight devices.

Referring to FIG. 8, a conventional direct type backlight device 10, which is arranged behind a display screen 20, mainly includes a plurality of light sources 11, a diffuser plate 12, a light guide plate 13, a reflection sheet 14 and a housing 15. The diffuser plate 12 is arranged between the light sources 11 and the display screen 20. The light guide plate 13 is arranged between the light sources 11 and the diffuser plate 12. The reflection sheet 14 is arranged behind the light sources 11 and fixed on the housing 15. The housing 15 defines an inner space and the light sources 11 are configured in the inner space. Furthermore, a prism sheet 16 can be configured on the diffuser plate 12 for adjusting differences of light intensity.

In use, light emitted from the light sources 11 is reflected by the reflection sheet 14 to the light guide plate 13, and is scattered by the light guide plate 13 to be transmitted to the diffuser plate 12. Then, the light is further scattered by the diffuser plate 12 to provide uniform light for the display screen 20.

The light sources 11 can be cold cathode fluorescent lamps. The cold cathode fluorescent lamps are linear and parallel with each other.

However, because the cold cathode fluorescent lamps are linear and parallel with each other, a number of dark regions are formed between each pair of cold cathode fluorescent lamps, as shown in FIG. 9. Therefore, brightness and chroma uniformity of the backlight device 10 are impaired.

Furthermore, because the light sources 11 are arranged in the closed space, heat generated by the light sources 11 is accumulated therein and temperature is greatly increased. The high temperature will adversely influence the displaying quality and reduce the service life of the cold cathode fluorescent lamps and other components adjacent to the lamps.

What is needed, therefore, is a backlight device with high brightness and chroma uniformity.

SUMMARY OF INVENTION

A backlight device according to one preferred embodiment includes a reflection plate having a reflective surface and a heat dissipating surface, and a light source module disposed adjacent to the reflective surface of the reflection plate. The light source module includes at least a cold cathode fluorescent lamp, and the cold cathode fluorescent lamp comprising at least two parallel linear portions and at least one intermediate portion interconnected to the at least two linear portions.

A backlight device according to another preferred embodiment includes a reflection plate having a reflective surface, and a light source module disposed adjacent to the reflective surface of the reflection plate. The light source module includes a plurality of cold cathode fluorescent lamps, at least one of the cold cathode fluorescent lamps comprising two parallel linear portions and an intermediate portion interconnected to the two linear portions.

A backlight device according to another preferred embodiment includes a reflection plate having a reflective surface, and a cold cathode fluorescent lamp module disposed adjacent to the reflective surface of the reflection plate; the cold cathode fluorescent lamp module comprising a plurality of parallel linear elongated portions and a plurality of intermediate portions interconnected to the linear elongated portions.

The backlight device further includes a cooling module, and the cooling module is attached on the heat dissipating surface of the reflection plate.

Compared with conventional backlight device, the present backlight device has the following advantages. Because the light source module includes at least one cold cathode fluorescent lamp, and the cold cathode fluorescent lamp includes at least two parallel linear portions and at least one intermediate portion interconnected to the parallel linear portions, the intermediate portion can enhance brightness of the regions between the two neighboring parallel linear portions and eliminate dark regions, and improve brightness and chroma uniformity. Further, the backlight device includes a cooling module, the heat generated by the light source module can be effectively dissipated. The temperature of the cold cathode fluorescent lamp is lowered, and so maintained within a safety range. Thus, the light emitting capability of the cold cathode fluorescent can be fully exploited. The brightness of the light source module is improved, and the utilization efficiency of light thereof is accordingly increased.

Other advantages and novel features will become more apparent from the following detailed description of present backlight device, when taken in conjunction with the accompanying drawings.

BRIEF DESCRIPTION OF DRAWINGS

Many aspects of the present backlight device can be better understood with reference to the following drawings. The components in the drawings are not necessarily to scale, the emphasis instead being placed upon clearly illustrating the principles of the present backlight device. Moreover, in the drawings, like reference numerals designate corresponding parts throughout the several views.

DETAILED DESCRIPTION

Reference will now be made to the drawings to describe preferred embodiments of the present backlight device, in detail.

Figure 1:
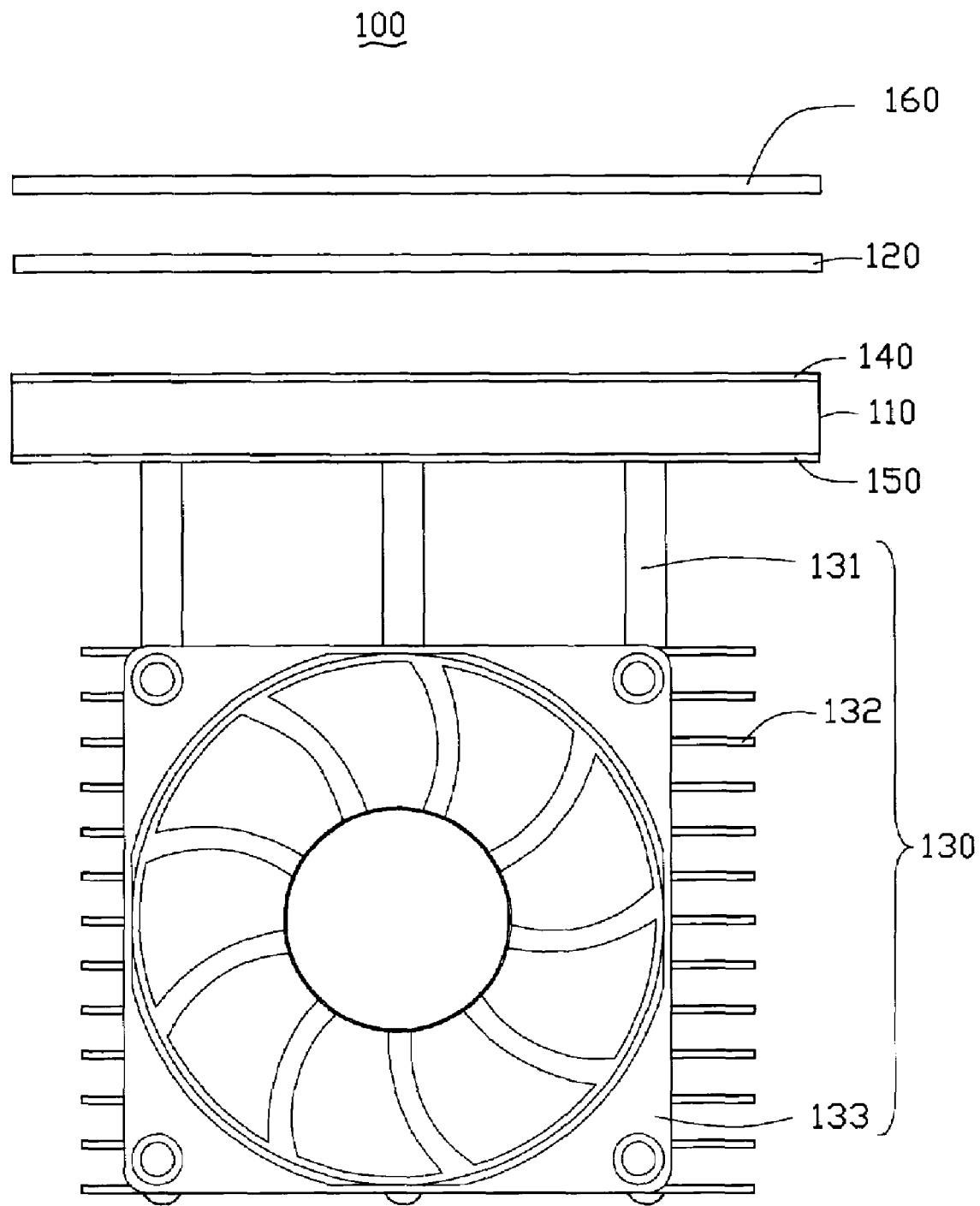
FIG. 1 is a schematic, side view of a backlight device in accordance with a first preferred embodiment.
Figure 2:
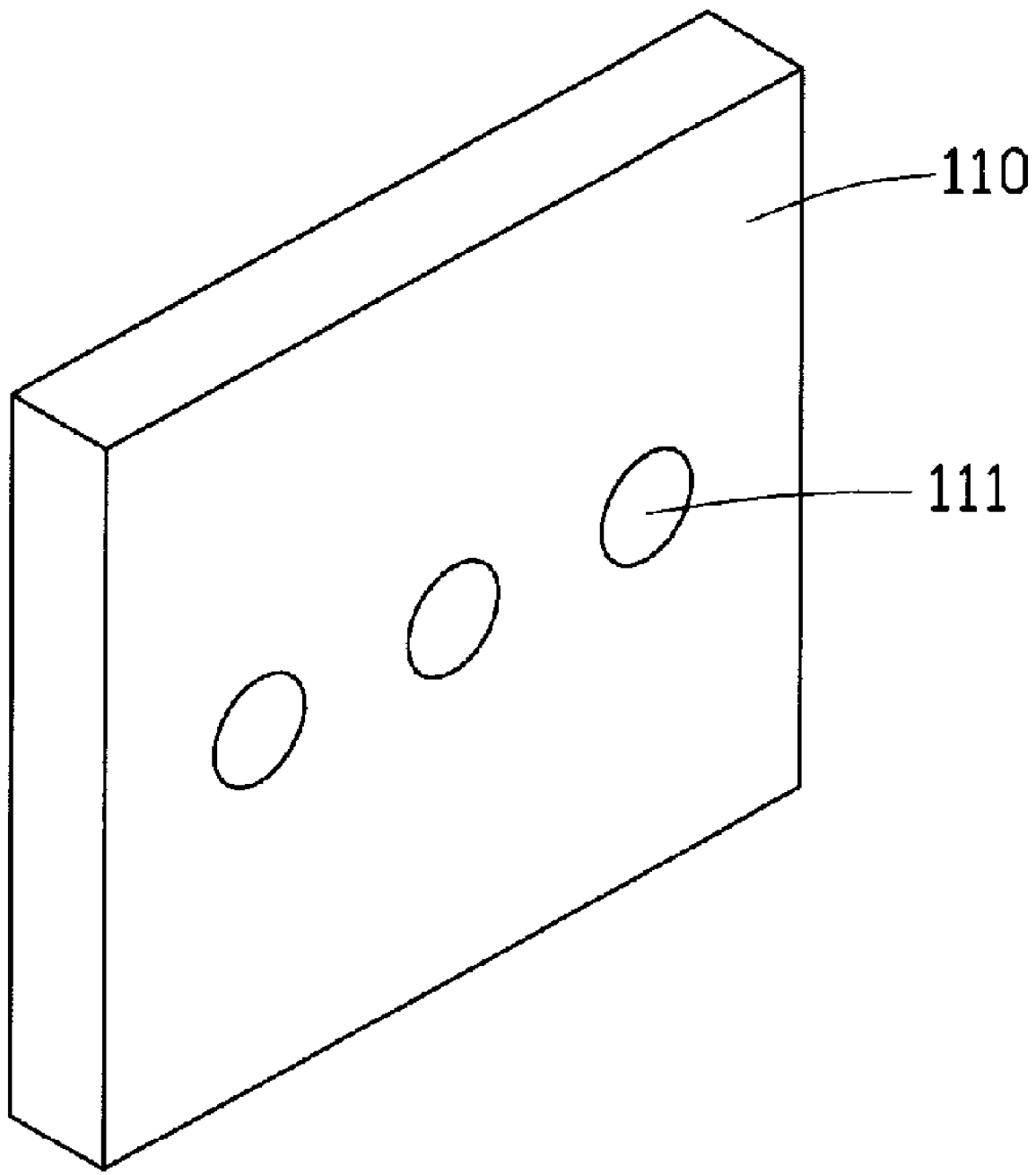
FIG. 2 is an isometric view of a reflection plate of FIG. 1.
Figure 3:
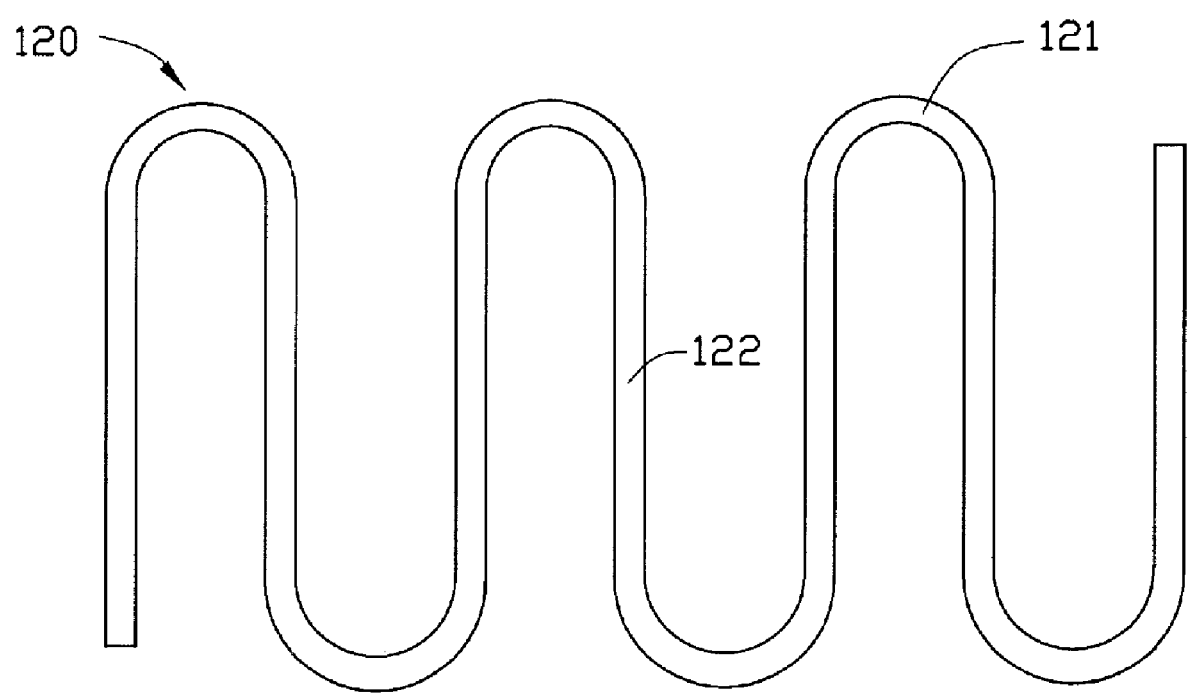
FIG. 3 is a schematic view of a light source module of FIG. 1.

Referring to FIGS. 1 to 3, a backlight device 100, in accordance with a first preferred embodiment, is shown. The backlight device 100 is a direct type backlight device and includes a reflection plate 110 having a reflective surface and an opposite heat dissipating surface, a light source module 120 disposed adjacent to the reflective surface of the reflection plate 110, and a cooling module 130 attached on the heat dissipating surface of the reflection plate 110.

The reflection plate 110 can be made from a thermally conductive material with high heat conducting property, such as Copper (Cu) or Aluminum (Al), preferably Cu. As shown in FIG. 2, a number of holes 111 are uniformly defined on the heat dissipating surface of the reflection plate 110. The holes 111 extend in a direction perpendicular to a main plane of the reflection plate 110. A reflective thin film 140 can be formed on the reflective surface of the reflection plate 110. The reflective film 140 can be made from a metallic material, such as Silver (Ag) or Al, preferably Ag. A thickness of the reflective film 140 is in the range from 100 nanometers to 1,000 nanometers. The reflective film 140 is used to reflect light emitted from the light source module 120. A thermally conductive film 150 is coated on the heat dissipating surface of the reflection plate 110. A thickness of the thermal conductive film 150 is in the range from 100 nanometers to 1,000 nanometers. The thermally conductive film 150 can be made from a thermally conductive material, such as Cu.

In order to improve an brightness and chroma uniformity, a diffuser plate 160 is disposed adjacent to the light source module 120.

Referring to FIG. 3, the light source module 120 comprises a cold cathode fluorescent lamp. The cold cathode fluorescent lamp has a concertinaed configuration. Specifically, the cold cathode fluorescent lamp includes at least two parallel linear portions 122 and at least one intermediate portion 121 interconnected to the at least two parallel linear portions 122.

The cooling module 130 includes a plurality of heat pipes 131, a heat sink 132 and a cooling fan 133. Each of the heat pipes 131 includes an evaporating section for absorbing heat and a condensing section for discharging heat. Evaporating sections (not shown) of the heat pipes 131 are connected with the reflection plate 110. Preferably, the evaporating sections of the heat pipe 131 are inserted into the holes 111 of the reflection plate 110. The condensing sections (not shown) of the heat pipes 131 are connected with the heat sink 132 perpendicularly. The cooling fan 133 is attached to the heat sink 132 for accelerating cooling.

Compared with conventional backlight device, the present backlight device 100 has the following advantages. Because the cold cathode fluorescent lamp 120 includes at least two parallel linear portions 122 and at least one intermediate portion 121 interconnected to the at least two parallel linear portions 122, the intermediate portion 121 can enhance brightness of regions between the corresponding two parallel linear portions 122 and thus eliminate dark regions. Therefore, the cold cathode fluorescent lamp 120 can enhance brightness and chroma Uniformity.

Furthermore, because the cooling module 130 is used, the heat generated by the light source module 120 can be effectively dissipated. The temperature of the cold cathode fluorescent lamp is lowered, and maintained within a safety range. Thus, the light emitting capability of the cold cathode fluorescent can be fully exploited. The brightness of the light source module 120 is improved, and the utilization efficiency of light thereof is also increased, accordingly.

Figure 4:
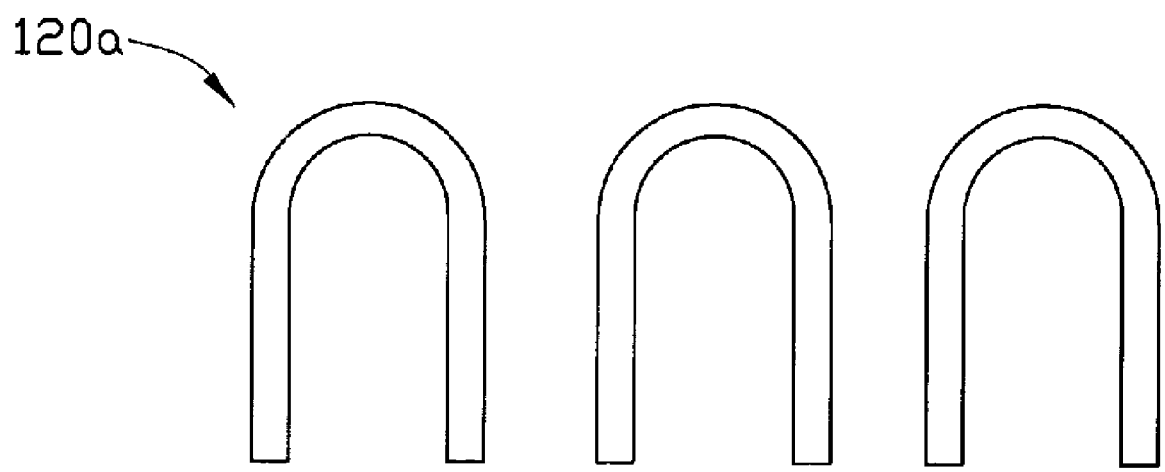
FIG. 4 is a schematic view of a light source module of a backlight device in accordance with a second preferred embodiment.

Referring to FIG. 4, a backlight device, in accordance with a second preferred embodiment, is shown. The backlight device is similar with the first embodiment, except that a light source module 120*a* comprising a plurality of cold cathode fluorescent lamps is employed instead. The cold cathode fluorescent lamps are U-shaped, and are arranged in one row with distal ends of the U-shaped cold cathode fluorescent lamps all facing in one direction.

Figure 5:
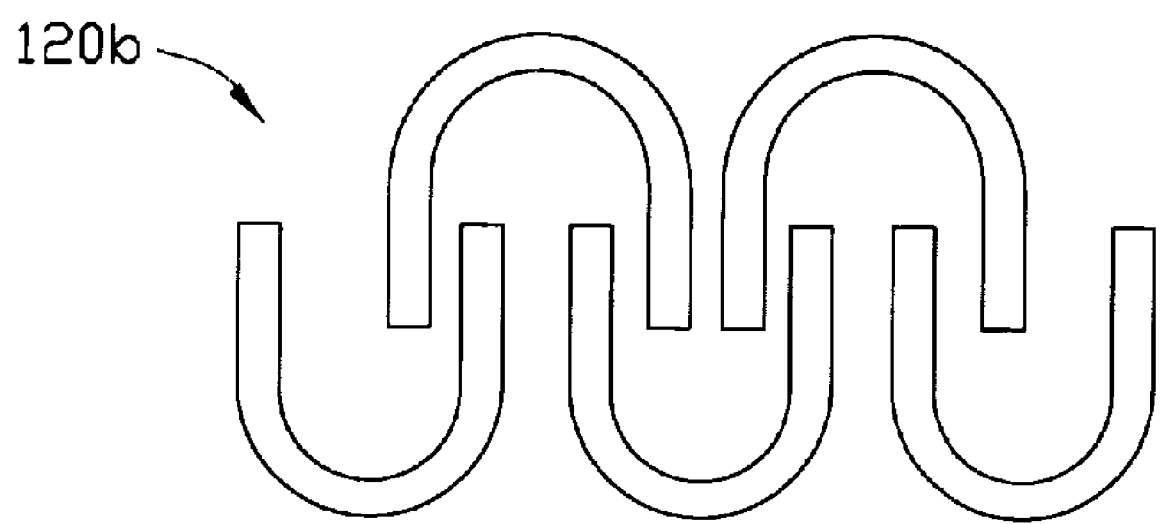
FIG. 5 is a schematic view of a light source module of a backlight device in accordance with a third preferred embodiment.

Referring to FIG. 5, a backlight device, in accordance with a third preferred embodiment, is shown. The third embodiment is similar to the first embodiment except that a light source module 120*b* comprising a plurality of cold cathode fluorescent lamps is employed instead. The cold cathode fluorescent lamps are U-shaped, and arranged in two rows with distal ends of the cold cathode fluorescent lamps in a row facing in one direction and distal ends of the cold cathode fluorescent lamps in another row facing in an opposite direction.

Figure 6:
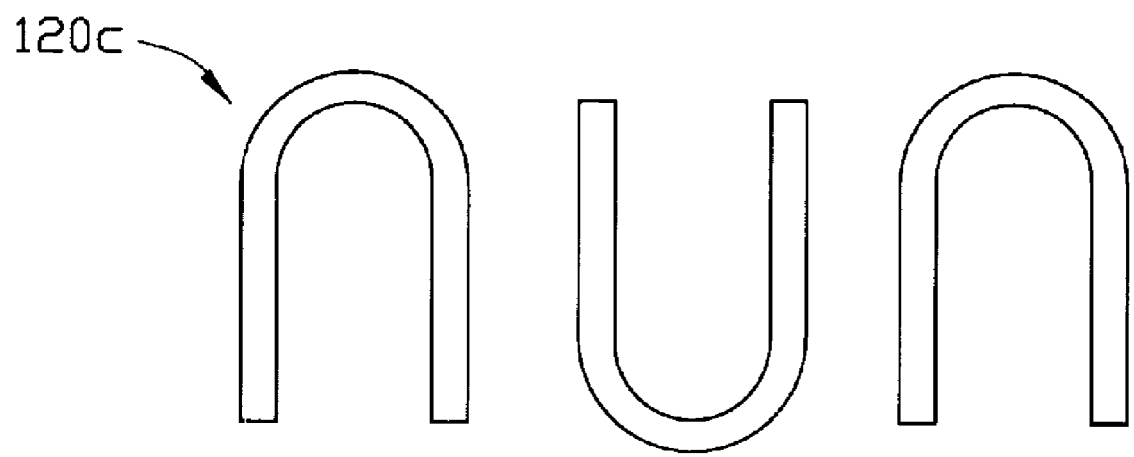
FIG. 6 is a schematic view of a light source module of a backlight device in accordance with a fourth preferred embodiment.

Referring to FIG. 6, a backlight device, in accordance with a fourth preferred embodiment, is shown. The backlight device is similar to the first embodiment, except that a light source module 120*c* comprising a plurality of cold cathode fluorescent lamps is employed instead. The cold cathode fluorescent lamps are U-shape, and arranged in a row with distal ends of every two adjacent cold cathode fluorescent lamps facing in opposite directions.

Figure 7:
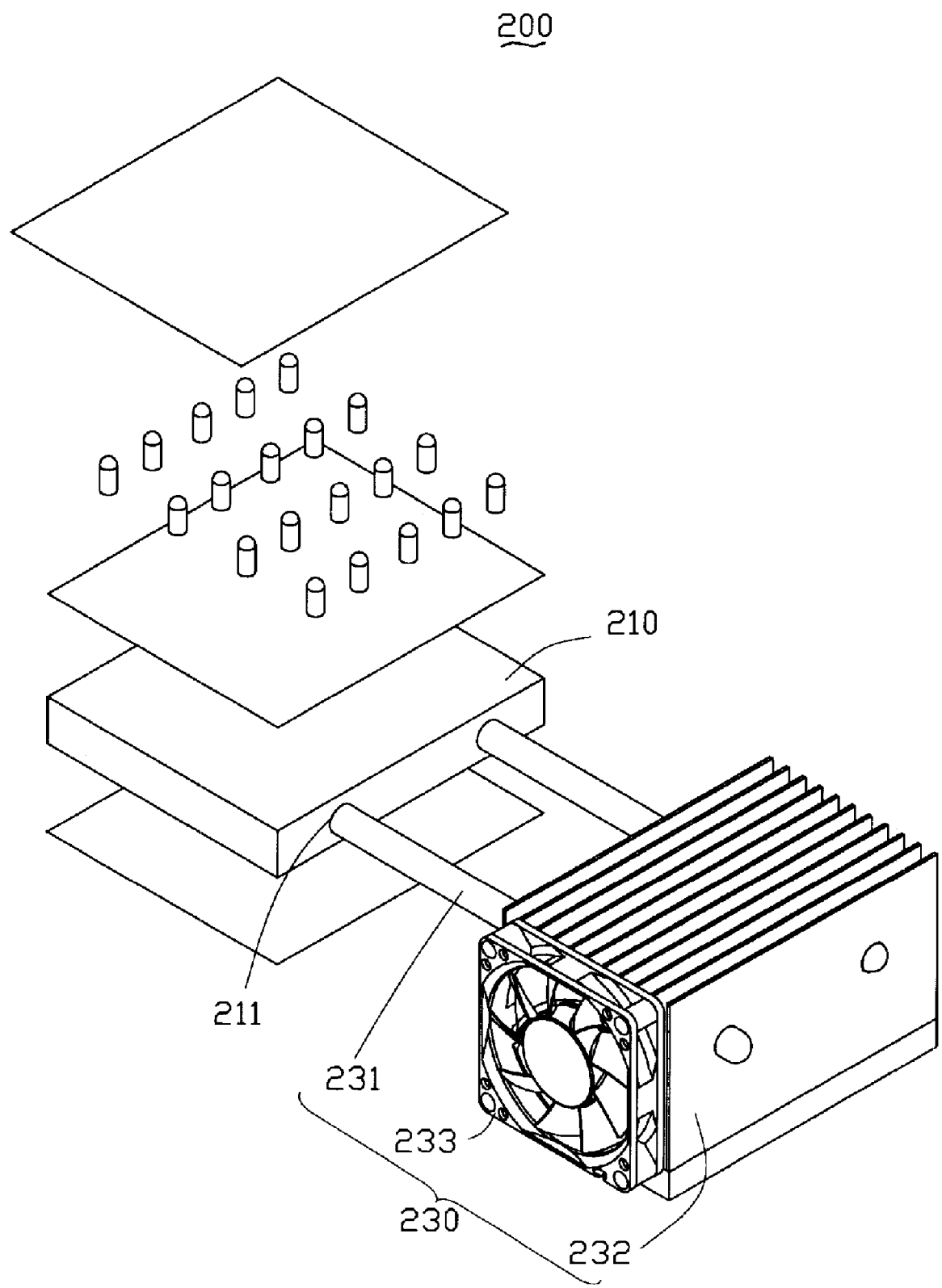
FIG. 7 is an exploded, isometric view of a backlight device in accordance with a fifth preferred embodiment.
Figure 8:
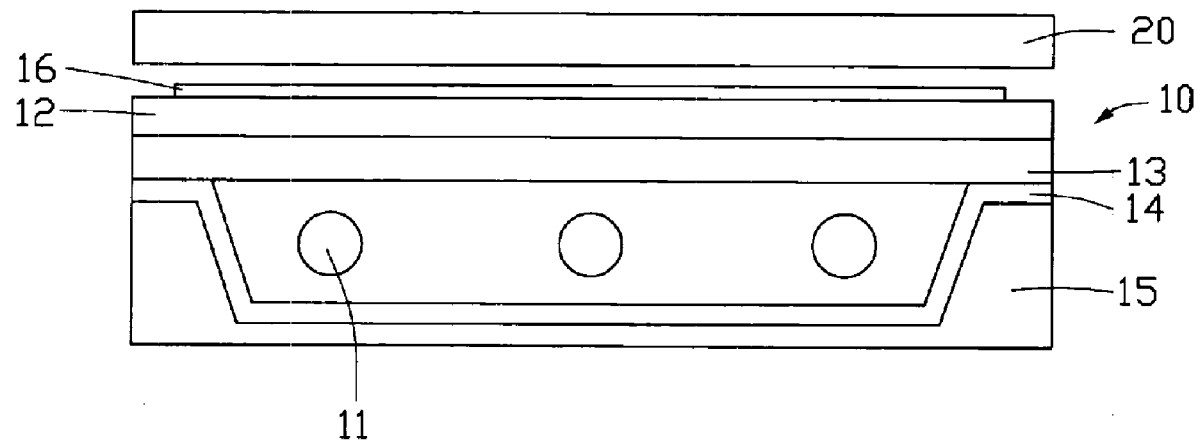
FIG. 8 is a schematic, side view of a backlight device of a conventional backlight device.
Figure 9:
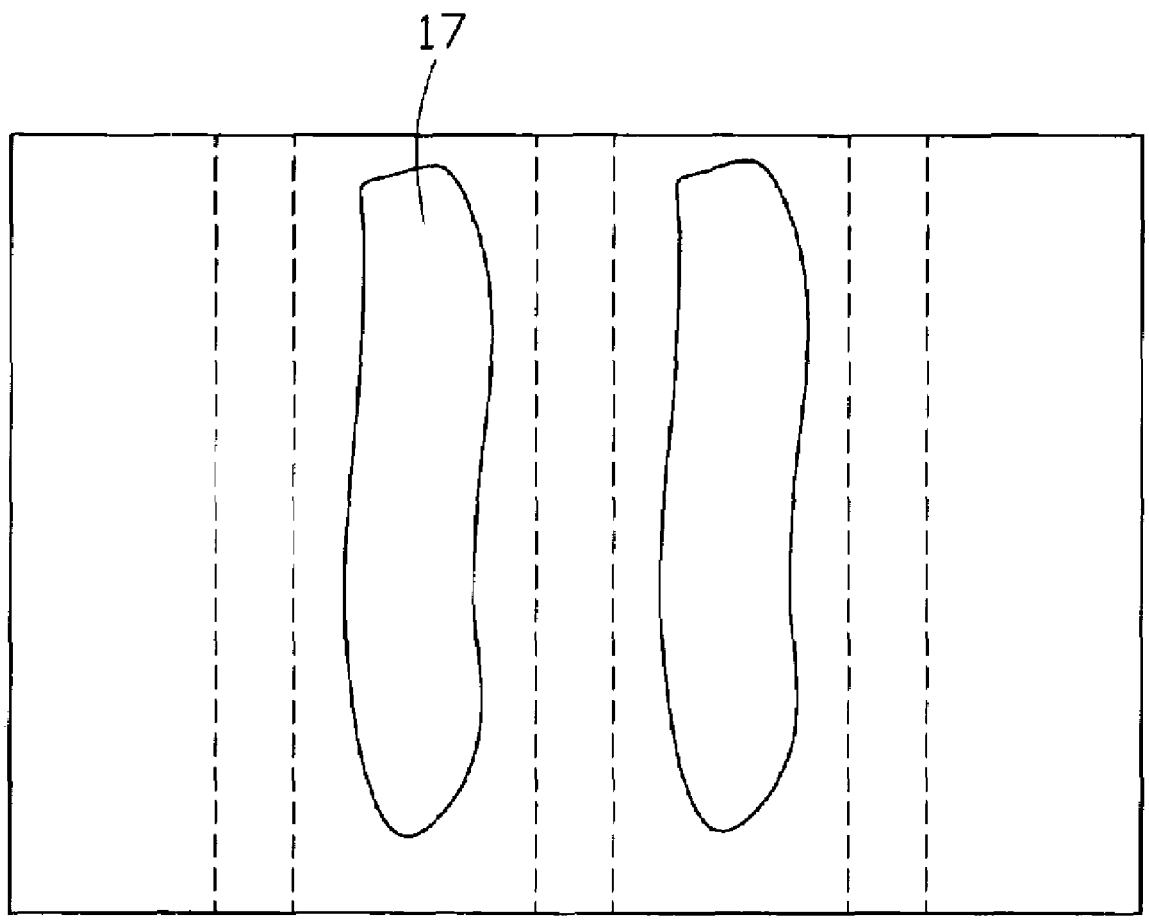
FIG. 9 is a schematic, top view showing dark regions of the backlight device of FIG. 8.

Referring to FIG. 7, a backlight device, in accordance with a fifth preferred embodiment, is shown. The backlight device is similar with the first embodiment. However, holes 211 extend in a direction parallel to a main plane of a reflection plate 210, and a cooling module 230 is attached sideways onto the reflection plate 210. The cooling module 230 includes a plurality of heat pipes 231, a heat sink and a cooling fan 233. Evaporating sections (not shown) of the heat pipes 231 are inserted into the holes 211 of the reflection plate 210. Condensing sections (not shown) of the heat pipes 231 are connected with the heat sink 132. The cooling fan 233 is attached to the heat sink 232 for accelerating cooling. Furthermore, a light source module can be the light source module as shown in FIG. 3, FIG. 4, FIG. 5, or FIG. 6.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A backlight device, comprising:
a reflection plate having a reflective surface and a heat dissipating surface at an opposite side of the reflection plate to the reflective surface;
a light source module disposed adjacent to the reflective surface of the reflection plate, the light source module comprising at least a cold cathode fluorescent lamp, and the cold cathode fluorescent lamp comprising at least two parallel linear portions and at least one intermediate portion interconnected to the at least two linear portions; and a cooling module attached to the heat dissipating surface of the reflection plate, the light source and the cooling module located at opposite sides of the reflection plate, wherein the cooling module comprises a plurality of heat pipes, a heat sink and a cooling fan, each of the heat pipes having an evaporating section connected with the reflection plate, and a condensing section connected with the heat sink, and the cooling fan is attached to the heat sink.

2. The backlight device as claimed in claim 1, wherein the cold cathode fluorescent lamp is configured in a concertinaed fashion, and has a plurality of substantially parallel elongated portions and a plurality of intermediate portions interconnected with adjacent neighboring elongated portions.

3. The backlight device as claimed in claim 1, wherein the reflection plate is made from one of Copper and Aluminum.

4. The backlight device as claimed in claim 1, wherein the reflection plate includes a number of holes, with the evaporating sections of the heat pipes being received therein.

5. The backlight device as claimed in claim 1, further comprising a reflection film formed on the reflective surface of the reflection plate.

6. The backlight device as claimed in claim 5, wherein the reflection film is comprised of one of Silver and Aluminum.

7. The backlight device as claimed in claim 5, wherein a thickness of the reflection film is in the range from 100nanometers to 1,000 nanometers.

8. The backlight device as claimed in claim 1, farther comprising a thermally conductive film on the heat dissipating surface of the reflection plate.

9. The backlight device as claimed in claim 8, wherein the thermally conductive film is comprised of Copper.

10. The backlight device as claimed in claim 8, wherein a thickness of the thermal conductive film is in the range from 100 nanometers to 1,000 nanometers.

* * * * *